March 11, 1952  C. A. KUMINS ET AL  2,588,853
METHOD OF PRODUCING SILICA POWDER
Filed July 2, 1948
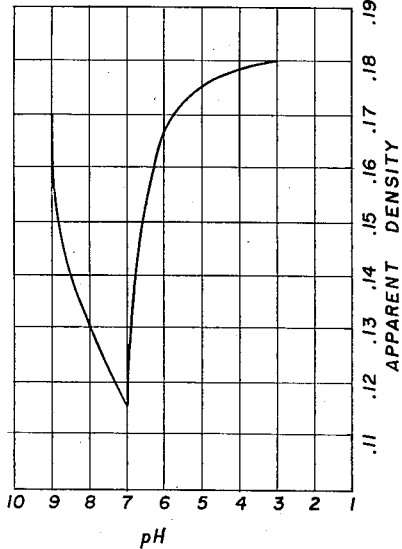
Fig. 1
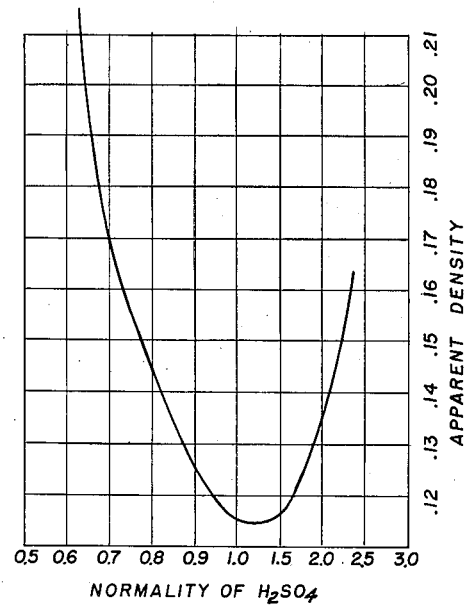
Fig. 2
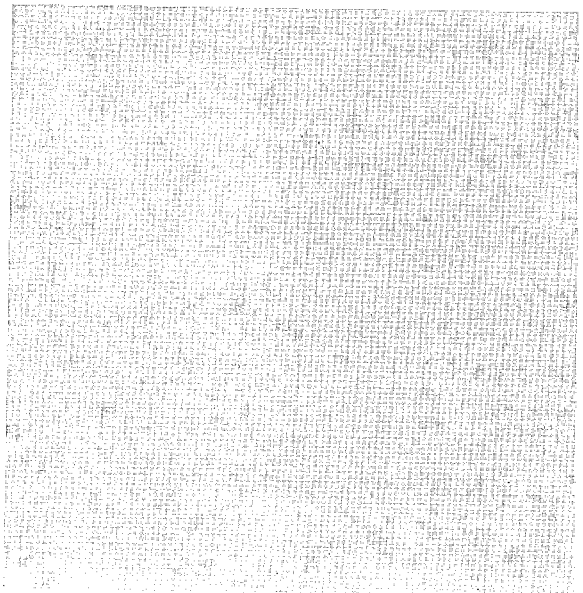
Fig. 4
60.000 X
one micron
Fig. 3
INVENTORS
CHARLES A. KUMINS
GLORIA R. GREENING
BY Eric C. Franke Patented Mar. 11, 1952

2,588,853

UNITED STATES PATENT OFFICE 2,588,853

METHOD OF PRODUCING SILICA POWDER

Charles A. Kumins, Brooklyn, N. Y., and Gloria R. Greening, Radburn, N. J., assignors to Interchemical Corporation, New York, N. Y., a corporation of Ohio Application July 2, 1948, Serial No. 36,766

3 Claims. (Cl. 23—182)

This invention relates to the preparation of amorphous silica, and more particularly to a method of producing a soft, non-gritty silica powder of submicroscopic particle size and extremely low apparent density. Aside from an increased usefulness for many prior applications of silica, such as a reinforcing agent and extender for rubber and elastomers, as adsorbent, catalyst carrier, or insulating material, the properties of silica powder prepared according to this disclosure make it especially valuable as a flatting agent in paints, lacquers and other organic coatings.

The commonly employed method of preparing silica consists in mixing the solutions of an alkali metal silicate and an acid or a salt, allowing the reaction mixture to gel, breaking up the gel, washing it free from salt, dehydrating by heat and grinding the dried material. The finished product, commercially known as silica gel, is obtained in form of hard granulae of relatively high density and fine pore size. Although such silica gels are excellent as adsorbents for readily condensable gases, in view of their hardness and large aggregate size they are unsuitable or less suitable as fillers, bodying agents, polishing abrasives or insulating materials. The observation that silica gels differ a great deal in their specific properties resulted in numerous recommendations as to conditions of reaction, speed of gelation, drying of the gel, etc., but prior attempts to obtain by means of this procedure silica xerogels in the form of a soft, non-gritty material of submicroscopic particle size have been unsuccessful.

When an alkali metal silicate is reacted with an acid, a colloidal solution of hydrated ortho-silicic acid forms first which, depending upon the reaction conditions, sooner or later sets to a hydrogel. It is assumed today that gels of this type consist of a solid micellar structure with a fluid phase held by attraction in the interstices. Some such silica gels are known to contain 300 and more molecules of water to each $SiO_2$ When this water is driven out by heat as in the commonly employed method of making silica, depending upon the degree of heating, the gel is converted more or less completely to anhydrous silicon dioxide. The gel shrinks greatly as the water is driven off and forms a relatively close textured solid mass which has a void space of only 30 to 50 per cent. It is obvious that agglomerates of such density and of the hardness of silica will strongly resist grinding and micropulverizing and that they will furnish a coarse and gritty material rather than a soft powder.

We have now discovered that if the reaction between an alkali metal silicate and an acid is carried out under specific limitations and the batch is diluted at the point of incipient gelation, or when gelation is permitted and the gel is subsequently liquefied by heat, upon further heating the colloidal solution of ortho-silicic acid is gradually dehydrated to intermediates of low hydration which precipitate and may easily be separated from the liquid. We found, furthermore, that the relative concentration of reactants and the pH at the point of gel formation constitute not only the factors which determine the degree of dehydration in the liquid state so as to obtain solids which may easily be separated from the liquid, but that the same factors determine the specific properties of the final product, such as degree of aggregation, apparent density, softness, etc.

While we do not want to be limited by any theory, we believe, from our experiments, that when ortho-silicic acid sets to a gel, the gel is produced by means of hydrogen-oxygen bonds formed by co-valent forces. At neutrality both hydrogen and hydroxyl ions are kept at a minimum and inasmuch as the tendency to form bridges will be the least at the point of neutrality, a gel which sets at pH 7 will be less complex than at any other pH. In addition, there must be in gelation an equilibrium between intramicellar complexity, spatial extent of the individual micellae and the amount of water occluded in the gel structure, depending upon the concentration of the reagents. When gelation is prevented or the gel is liquefied and the colloidal solution of the ortho-silicic acid is dehydrated by heat, the complexity of the partly dehydrated polymers which precipitate from the solution will be of an order commensurate to the intramicellar complexity and spatial extent of the gel. In contrast to silica gel which is dehydrated in the known manner by driving off the water through heat, whereby the remaining micellae shrink and bake together and strongly resist any subsequent breaking into small particles, our discovery of dehydrating silica in solution by means of heat produces a slurry of minute aggregates which are unattached to each other and which upon drying and milling easily break into a soft powder. Our discovery of the reaction conditions which determine the complexity and structure of the gel and of the partially dehydrated silica enables us to produce powders of submicroscopic particle size and unusually low apparent density, entirely dissimilar from heretofore known silica.

The results of our discovery are set forth in the accompanying drawings. In Fig. 1 the pH of the reaction mixture prior to gelation is found plotted against the apparent density of the final product, while Fig. 2 illustrates the influence of various acid concentrations upon the properties of the resulting silica. Fig. 3 represents the scale of an electron micrograph, Fig. 4, showing silica made according to the present invention at a 60,000 magnification.

While our examples illustrate our method as applied to commercial sodium silicate solutions, those of the other alkali metals may be used equivalently. Sodium silicate is preferred because of its readier availability and lower price. Commercial sodium silicate solution (water glass) was used throughout the experiments. Of various acids tested for the making of silica according to this disclosure, sulfuric acid gave the best results while the desirability of other acids decreases in about the following order: acetic-, hydrochloric-, phosphoric, carbonic- acid.

As a quick reproducible test for the quality of the finished product, we determine the apparent density, a factor which jointly expresses the degree of aggregation and the amount of internal space within the aggregates. For the test we employ a 100 ml. cylinder having an internal diameter of 2.5 cm. The powdered silica is poured into the cylinder by means of a wide throated funnel the exit of which is kept fixed at exactly 5.7 cm. from the 100 ml. mark of the cylinder. The funnel has a maximum diameter of 6.3 cm., a minimum diameter of 1.5 cm. at the exit, and a vertical distance of 3.8 cm. between diameters. The net weight of 100 ml. of the material represents the apparent density.

As may be seen from Fig. 1, a pH of 7 is required for silica of lowest apparent density. At both a higher and a lower pH the apparent density of the finished product increases. Toward pH 9 the curve flattens and may be visualized as continuing without perceptible change in pH toward a point of merger between the apparent and true density of silicon dioxide (2.2). Likewise, the apparent density increases rapidly with decreasing pH values until an apparent density of 0.18 (equal to 11.23 lbs. per cubic foot) is attained at about pH 3.

Fig. 2 discloses that a 1.25 normal sulfuric acid is required for a product having the lowest apparent density (0.115; equal to 7.18 lbs. per cubic foot) which is attainable under the stated conditions. Any increase or decrease in the acid concentration causes an increase in the apparent density of the product. In addition, we found that with increased dilution of the acid, filtration after heat dehydration of the colloidal solution becomes increasingly difficult, indicating a less efficient dehydration which may be due to a more complex structure of the gel and a more tenacious occlusion of water.

The foregoing statements refer to experiments whereby sodium silicate solutions of about 39.2% ($Na_2O + 3.2SiO_2$) had been used. Additional experiments where the sodium silicate solution was diluted to various degrees prior to mixing with the acid were made with a view of determining the influence of the sodium silicate concentration upon the properties of the final product. At each test the total volume of the reaction mixture was kept the same as in a similar prior experiment where the sulfuric acid concentration had been varied. In this manner we were able to establish whether changes in the properties of the final product were the result of the total volume of the reaction mixture or of the concentration of the individual reagents. In every instance the result was a product of a much higher apparent density than silica from prior batches where the total volume had been the same but where a more dilute sulfuric acid had been used; indicating that the aggregate size and the internal structure of the product depend primarily upon the concentration of the individual reagents.

In practicing our invention we find that with a technical sodium silicate solution of the above described composition we obtain a soft silica powder having an aggregate size of 0.01 to 0.02 micron and an apparent density of not more than 0.12, or a weight of 7.5 lbs. per cubic foot, respectively, when using sulfuric acid of a strength of 0.95 to 1.65 normal. Silica of still smaller aggregate size is obtainable with a more concentrated sodium silicate solution and sulfuric acid of somewhat higher concentration, but economic considerations speak against the employment of sodium silicate solutions of higher concentrations. It does not seem to make any difference whether the sodium silicate solution is mixed into the sulfuric acid or vice versa, as long as the reaction mixture is properly agitated. A careful pH control must be maintained during the mixing, unless the amount and concentration of the acid and of the sodium silicate solution has been exactly predetermined. Spontaneous gelation occurs at pH 7. The heating and solubilizing of the gel is greatly facilitated by using the proper kind of mixer. A fast agitator will only cut through and break the gel within its own radius, while a slow moving rake will break up the gel and provide a more efficient heating. In the absence of a reflux condenser a loose cover on the reaction vessel will give sufficient cooling, provided the vessel has not been filled to capacity. After the gel has been liquefied, the solution is brought to a boil and kept at boiling point for 1 to 3 hours. The colloidal solution changes thereby into a slurry of solids which are then separated by filtering, centrifuging, or by any other suitable means. Preferably at this point the solids are washed free from sodium sulfate. Final dehydration may be carried out in any suitable manner, such as in a rotary drier. We find it convenient to dry at 110 to 120° C. to a moisture content of about 8 per cent. The dry material is then charged into a micropulverizer and, if desired, into a ball mill after micropulverizing.

We claim:

1. The method of producing silica powder which comprises neutralizing a sodium silicate solution containing the equivalent of about 39.2 per cent ($Na_2O + 3.2SiO_2$) with 0.95 to 1.65 normal sulfuric acid, diluting with water at the point of incipient gelation to break up the gel, heating, precipitating partially dehydrated silica by boiling under reflux, and separating, washing, drying and pulverizing the precipitate.

2. The method of producing silica powder which comprises neutralizing a sodium silicate solution containing the equivalent of about 39.2 per cent ($Na_2O + 3.2SiO_2$) with 0.95 to 1.65 normal sulfuric acid, boiling and refluxing to liquefy the ensuing gel and to precipitate partially dehydrated silica, and separating, washing, drying and pulverizing the precipitate.

3. The method of producing silica powder which comprises neutralizing a sodium silicate solution containing the equivalent of about 39.2 per cent ($Na_2O+3.2SiO_2$) with 0.95 to 1.65 normal sulfuric acid, stirring, boiling and refluxing to liquefy the ensuing gel and to precipitate partially dehydrated silica, and separating, washing, drying and pulverizing the precipitate.

CHARLES A. KUMINS.
GLORIA R. GREENING.

REFERENCES CITED

The following references are of record in the file of this patent:

UNITED STATES PATENTS

| Number | Name | Date |
|---|---|---|
| 1,506,118 | Govers | Aug. 26, 1924 |
| 1,819,356 | Church | Aug. 18, 1931 |
| 1,872,183 | Porter | Aug. 16, 1932 |
| 1,995,803 | Gilbert | Mar. 26, 1935 |
| 2,109,337 | Mayfield | Feb. 22, 1938 |

OTHER REFERENCES

"Silicic Acid," by V. Lehner, in the J. A. C. S., pp. 391–396, vol. 43, 1921.

"Silicic Acid Gels," by H. N. Holmes, J. Phys. Chem., vol. 22 (1918), pp. 510–519.